US005696066A

United States Patent [19]

Kinker et al.

[11] Patent Number: 5,696,066
[45] Date of Patent: Dec. 9, 1997

[54] ADDITIVE FOR LUBRICATING OIL

[75] Inventors: Bernard George Kinker, Kintnersville; Bridget Marie Stevens, Horsham; Jerry William Washel, Hatfield, all of Pa.

[73] Assignee: Rohm and Haas Company, Phila., Pa.

[21] Appl. No.: 672,313

[22] Filed: Jun. 28, 1996

Related U.S. Application Data

[63] Continuation of Ser. No. 321,674, Oct. 12, 1994, abandoned.

[51] Int. Cl.$^6$ .................. C10M 145/14; C10M 105/32; C10M 105/38
[52] U.S. Cl. .................. 508/469; 508/485; 508/491
[58] Field of Search .................. 252/56 S, 56 R; 526/328; 508/485, 474, 491, 498, 469

[56] References Cited

U.S. PATENT DOCUMENTS

| | | | |
|---|---|---|---|
| 3,679,644 | 7/1972 | van der Meij et al. | 252/56 R |
| 4,045,376 | 8/1977 | Rubin et al. | 252/56 R |
| 4,753,743 | 6/1988 | Sech. | |
| 4,783,274 | 11/1988 | Jokinen et al. | |
| 4,822,508 | 4/1989 | Pennewiss et al. | 252/56 |
| 4,885,104 | 12/1989 | Sturwold | 252/56 R |
| 5,112,509 | 5/1992 | Brink et al. | 252/56 R |
| 5,312,884 | 5/1994 | Gore et al. | 526/328 |
| 5,338,471 | 8/1994 | Lal | 252/56 R |
| 5,358,652 | 10/1994 | Macpherson. | |
| 5,368,761 | 11/1994 | Gore et al. | 252/56 R |
| 5,378,249 | 1/1995 | Morrison | 252/56 R |
| 5,413,725 | 5/1995 | Lal et al. | 252/18 |

FOREIGN PATENT DOCUMENTS

| | | |
|---|---|---|
| 572273 | 5/1993 | European Pat. Off. . |
| 635561 | 1/1995 | European Pat. Off. . |
| 644252 | 3/1995 | European Pat. Off. . |
| 439254 | 7/1995 | European Pat. Off. . |
| 9414860 | 7/1994 | WIPO . |

*Primary Examiner*—Margaret Medley
*Attorney, Agent, or Firm*—Darryl P. Frickey; Thomas J. Howell; Roger K. Graham

[57] ABSTRACT

A lubricating oil composition includes from 0.01 weight per cent to 2 weight per cent of a polymer that includes repeating units derived from a ($C_8$–$C_{15}$)alkyl (meth)acrylate monomer and 98 weight per cent to 99.99 weight per cent of a vegetable oil or a polyol ester.

10 Claims, No Drawings

ADDITIVE FOR LUBRICATING OIL

This application is a continuation of application Ser. No. 08/321,674, filed Oct. 12, 1994, and now abandoned.

The present invention relates to an additive for lubricating oils, more particularly to a poly((meth)acrylate) additive for vegetable oil based lubricating oil compositions and polyol ester based lubricating oil compositions.

Ecological concerns have sparked interest in replacing mineral oil-based lubricants with biodegradable lubricants for use in applications, such as, e.g., two-stroke engines for, e.g., boats and chain saws, and mobile hydraulic equipment, wherein the risk of exposure of a lubricant to the environment is relatively high. As used herein the term "biodegradable" broadly refers to any material that can be decomposed by a biological system. While a number of techniques for assessing the biodegradability of lubricating oils have been developed, none has, as yet, met with universal acceptance. At this early stage of development, vegetable oils and synthetic polyol esters have emerged as two promising candidates for replacing mineral oils as the base fluid to provide biodegradable lubricants.

Vegetable oil-based lubricants exhibit several performance limitations, e.g., relatively poor low temperature fluidity, relative to their mineral oil counterparts and there is an interest in improving the low temperature fluidity of synthetic polyol ester-based lubricating compositions.

In a first aspect of the present invention, a lubricating oil composition includes from 0.01 weight per cent (wt %) to 2 wt % of a polymer, said polymer including repeating units each derived from a ($C_8$–$C_{15}$)alkyl (meth)acrylate monomer, and from 98 wt % to 99.99 wt % of a vegetable oil or a polyol ester. The lubricating oil composition of the present invention provides improved low temperature fluidity and low temperature storage stability.

In a second aspect of the present invention, a polymer includes from 70 weight percent (wt %) to 99.5 wt % first repeating units, each derived from a ($C_8$–$C_{15}$)alkyl (meth) acrylate monomer and from 0.5 wt % to 30 wt % second repeating units, each derived from a ($C_{16}$–$C_{24}$)alkyl (meth) acrylate monomer.

As used herein, the terminology "(meth)acrylate" refers collectively to acrylate and methacrylate compounds. Commercially available alkyl (meth)acrylate monomers typically comprise a mixture of alkyl (meth)acrylate esters. Such mixtures are referred to herein using the name of the ester species predominating in the mixture.

As used herein, the terminology "($C_8$–$C_{15}$)alkyl" means any straight or branched alkyl group having 8 to 15 carbon atoms per group, e.g., octyl, nonyl, n-decyl, isodecyl, undecyl, lauryl, tridecyl, myristyl, pentadecyl. Suitable ($C_8$–$C_{15}$) alkyl (meth)acrylate monomers include, for example, octyl methacrylate, octyl acrylate, nonyl methacrylate, decyl methacrylate, decyl acrylate, isodecyl methacrylate, undecyl methacrylate, lauryl methacrylate, lauryl acrylate, tridecyl methacrylate, myristyl methacrylate, pentadecyl methacrylate, pentadecyl acrylate and mixtures thereof. In a preferred embodiment, the ($C_8$–$C_{15}$) alkyl (meth)acrylate monomer is lauryl methacrylate, myristyl methacrylate or a mixture thereof.

As used herein, the terminology "($C_{16}$–$C_{24}$)alkyl" means any straight or branched alkyl group having 16 to 24 carbon atoms per group, e.g., stearyl, cetyl, heptadecyl, nonadecyl, eicosyl. Suitable ($C_{16}$–$C_{24}$)alkyl (meth)acrylate monomers include, for example, stearyl methacrylate, cetyl methacrylate, cetyl acrylate, eicosyl methacrylate and mixtures thereof. In a preferred embodiment, the ($C_{16}$–$C_{24}$)alkyl (meth)acrylate monomer is cetyl methacrylate, stearyl methacrylate, eicosyl methacrylate or a mixture thereof.

In a preferred embodiment, the polymer includes from about 70 wt % to about 99.5 wt %, more preferably from about 82 wt % to about 97.5 wt %, first repeating units, each derived from a ($C_8$–$C_{15}$)alkyl (meth)acrylate monomer and from 0.5 wt % to 30 wt %, more preferably from about 2.5 wt % to about 18 wt %, second repeating units, each derived from a ($C_{16}$–$C_{24}$)alkyl (meth)acrylate monomer. In a very highly preferred embodiment, the polymer includes from 92.5 weight percent (wt %) to 95 wt % first repeating units, each derived from a ($C_8$–$C_{15}$)alkyl (meth)acrylate monomer and from 5 wt % to 7.5 wt % second repeating units, each derived from a ($C_{16}$–$C_{24}$)alkyl (meth)acrylate monomer.

In a preferred embodiment, the copolymer exhibits a weight average molecular weight, determined, e.g., by gel permeation chromatography, from about 50,000 to about 1,000,000, more preferably, from about 150,000 to about 250,000.

The molecular weight of the polymer may be characterized in terms of a loss in viscosity upon shearing of a solution of the polymer, measured in accord with the method of ASTM D 2603 and reported as the "shear loss due to polymer". In a preferred embodiment, the polymer of the present invention exhibits shear loss due to polymer of from about 1 to about 36 after 3 minutes of sonic shearing.

The polymer of the present invention is made, for example, by a free radical initiated solution polymerization of (meth)acrylate monomers in an oil soluble diluent, in the presence of a polymerization initiator.

Suitable polymerization initiators include initiators which disassociate upon heating to yield a free radical, e.g., peroxide compounds such as benzoic peroxide, t-butyl peroctoate, cumene hydroperoxide, and azo compounds such as azoisobutylnitrile,2,2'-azobis(2-methylbutanenitrile). T-butyl peroctoate is preferred as the polymerization initiator. The mixture includes, e.g., from about 0.25 pbw to about 1.0 pbw initiator per 100 pbw total monomer charge and, more preferably, from about 0.6 pbw to about 0.8 pbw initiator per 100 pbw total monomer charge.

The diluent may be any inert liquid that is miscible with the vegetable oil or polyol ester in which the polymer is to be subsequently used. Preferably, the diluent is a mineral oil, vegetable oil or polyol ester that is miscible with the vegetable oil or polyol ester in which the polymer is to be subsequently used. The mixture includes, e.g., from 20 pbw to 400 pbw diluent per 100 pbw total monomers and, more preferably, from about 50 to about 200 pbw diluent per 100 pbw total monomer charge. As used herein, "total monomer charge" means the combined amount of all monomers added to the reaction mixture over the entire course of the polymerization reaction.

The reaction mixture may, optionally, include a chain transfer agent. Suitable chain transfer agents include those conventional in the art, e.g., dodecyl mercaptan, ethyl mercaptan. Dodecyl mercaptan is preferred as the chain transfer agent. The selection of the amount of chain transfer agent to be used is based on the desired molecular weight of the polymer being synthesized. The reaction mixture typically includes, e.g., from about 0.5 pbw to about 1.0 pbw chain transfer agent per 100 pbw total monomer charge and more preferably includes from about 0.6 pbw to about 0.8 pbw chain transfer agent per 100 pbw total monomer charge.

The reactants are charged to a reaction vessel that is equipped with a stirrer, a thermometer and a reflux condenser and heated with stirring under a nitrogen blanket to a temperature from about 90° C. to about 125° C. The reaction mixture is then maintained at a temperature from about 90° C. to about 125° C. for a period of about 0.5 hours to about 12 hours to form the polymer.

In a preferred embodiment of the process, the polymerization initiator may be fed to the reaction vessel, either continuously or as one or more discrete portions, as the polymerization progresses, provided that the batch is then maintained at a temperature within the above-specified range with stirring for an additional period of about 0.5 hours to about 6 hours subsequent to the last addition of initiator.

A viscous solution of the polymer of the present invention in the diluent is obtained as the product of the above-described process.

The polymer is added to the vegetable oil or polyol ester in an amount effective to provide a lubricating oil composition having a desired pour point.

In a particularly preferred embodiment, the polymer is added to the vegetable oil or polyol ester in the form of a relatively concentrated solution of the polymer in a diluent, e.g., a solution about 25 wt % to 75 wt % of the polymer dissolved in from 25 wt % to 75 wt % of the above-described oil soluble diluent.

As used herein, the terminology "vegetable oil" means an oil extracted from the seeds, fruit or nuts of plant and includes, for example, rapeseed oil, sunflower oil, soybean oil, coconut oil, peanut oil, corn oil, and mixtures thereof. In a preferred embodiment, the vegetable oil is a grade of rapeseed oil having a low erucic acid content, more commonly known as canola oil.

As used herein the term "polyol ester" means a partial or complete ester of saturated or unsaturated fatty acids with an alcohol having two or more hydroxyl groups per molecule of the alcohol. Preferred polyol esters are those of long chain, e.g., $C_{12}$–$C_{22}$, saturated or unsaturated fatty acids such as, e.g., lauric acid, palmitic acid, stearic acid, oleic add, and linoleic acid, with alcohols having from 2 to 5 hydroxyl groups per molecule of the alcohol such as, e.g., neopentyl glycol, trimethylolpropane, and pentaerythritol. Preferred polyol esters include, e.g., neopentyl glycol dioleate, trimethylolpropane trioleate, trimethylolpropane triisostearate, trimethylolpropane tripelargonate, pentaerythritol tetraoleate, and mixtures thereof. In a highly preferred embodiment, the polyol ester is neopentyl glycol dioleate, trimethylolpropane trioleate, trimethylolpropane triisostearate. When the polyol ester is trimethylolpropane trioleate or neopentyl glycol dioleate, preferred polymers comprise from 90 weight percent to 99.5 weight percent first repeating units, each derived from a monomer selected from one or more of lauryl methacrylate and myristyl methacrylate; and from 0.5 weight percent to 10 weight percent second repeating units, each derived from a monomer selected from one or more of cetyl methacrylate, stearyl methacrylate and eicosyl methacrylate.

In a preferred embodiment of the lubricating oil composition, the lubricating oil composition of the present invention includes from 0.06 wt % to 1.8 wt %, more preferably from about 0.3 wt % to about 1.0 wt %, of the polymer and 98.2 wt % to 99.94 wt %, more preferably 99.0 wt % to 99.7 wt %, of the vegetable oil. When the vegetable oil is sunflower oil, preferred polymers comprise from 70 weight percent to 75 weight percent first repeating units, each derived from a monomer selected from one or more of lauryl methacrylate, myristyl methacrylate, tridecyl methacrylate and pentadecyl methacrylate; and from 25 weight percent to 30 weight percent second repeating units, each derived from a monomer selected from one or more of cetyl methacrylate, stearyl methacrylate and eicosyl methacrylate. When the vegetable oil is soy bean oil, preferred polymers comprise from 94 weight percent to 100 weight percent first repeating units, each derived from a monomer selected from one or more of lauryl methacrylate, myristyl methacrylate, tridecyl methacrylate and pentadecyl methacrylate; and from zero weight percent to 6 weight percent second repeating units, each derived from a monomer selected from one or more of cetyl methacrylate and stearyl methacrylate.

In an alternative preferred embodiment of the lubricating oil composition, the lubricating oil composition of the present invention includes from 0.01 wt % to 0.5 wt %, more preferably from 0.01 wt % to 0.2 wt %, and still more preferably from 0.02 wt % to 0.10 wt %, of the polymer and from 99.5 wt % to 99.99 wt %, more preferably from 99.8 wt % to 99.99 wt %, and still more preferably from 99.90 wt % to 99.98 wt %, of the polyol ester.

The lubricating oil composition of the present invention may include other additives such as, e.g., antioxidants and anti-wear additives, in addition to the polymer of the present invention.

EXAMPLES 1–10

The polymer composition of Example 1 was prepared as follows. A monomer mix was prepared from 482.05 g of lauryl methacrylate, 31.09 g of stearyl methacrylate, 25.00 g of 100N solvent neutral mineral oil, 1.25 g of polymerization initiator (50% solution of t-butyl peroctoate in odorless mineral spirits, Lupersol PMS), and 2.75 g of chain transfer agent (dodecyl mercaptan). To a nitrogen flushed reactor equipped with a condenser, addition funnel, stirrer, and temperature control system were added 216.86 g (40 wt %) of the above monomer mix which was then heated to 115° C. while stirring. A small exotherm carried the temperature of the reaction solution to about 118° C. When the temperature returned to 115° C., the remainder of the monomer mix was fed into the reactor at a uniform rate over a time period of 60 minutes. Thirty minutes after all of the monomer had been added, a second feed of 1.75 g of polymerization initiator (50% solution of t-butyl peroctoate in odorless mineral spirits, Lupersol PMS) in 75.00 g of 100N solvent neutral mineral oil was added at a uniform rate over a time period of 60 minutes. Thirty minutes after the initiator-in-oil solution had been added, 180.00 g of 100N solvent neutral mineral oil was added rapidly to dilute the polymer produced in the reactor. The polymer-in-oil solution so produced was stirred for 20 minutes and allowed to cool to room temperature. Theoretical polymers solids for this preparation are 62.6%. Actual solids are measured as The polymer-in-oil solution had a polymer solids content of 60.5 wt % (compared to a theoretical solids content of 62.6 wt %), representing a 96.7% conversion of monomers to polymer.

The polymer compositions of Examples 2–10 were prepared by a process analogous to that disclosed above for the composition of Example 1, except for the composition of the monomer mixture used. The composition of each of the respective monomer mixtures used to make the polymers of Examples 1–10 are set forth below in TABLE 1. The following monomers were used: lauryl methacrylate (LMA), stearyl methacrylate (SMA) and cetyl methacrylate (CEMA).

TABLE 1

| Example # | LMA (wt %) | SMA (wt %) | CEMA (wt %) |
|---|---|---|---|
| 1 | 94 | 6 | — |
| 2 | 100 | — | — |
| 3 | 95 | 5 | — |
| 4 | 92.5 | 7.5 | — |
| 5 | 90 | 10 | — |
| 6 | 85 | — | 15 |
| 7 | 80 | — | 20 |
| 8 | 75 | — | 25 |
| 9 | 70 | — | 30 |
| 10 | 55 | — | 45 |

The polymer solutions of Examples 1, 2, 6 and 9 were added to polyol esters (trimethylolpropane tripelargonate (Emery® 2934, Henkel Corporation, Cincinnati, Ohio), trimethylolpropane triisostearate (Emery® 2951A, Henkel Corporation), trimethylolpropane trioleate (Emery® 2964 A, Henkel Corporation), neopentyl glycol dioleate (Emery® 2965, Henkel Corporation) and pentaerythritol tetraoleate (Emery® 2898, Henkel Corporation), in an amount effective to provide 0.06 wt % polymer solids.

The pour point of each of the esters and several combinations of the respective polymers and esters were measured according to ASTM D 97.

Results are set forth in TABLE 2 as pour point, expressed in °C, for each of the compositions tested. The esters are denoted in the table as trimethylolpropane tripelargonate (Ester A), trimethylolpropane triisostearate (Ester B), trimethylolpropane trioleate (Ester C), neopentyl glycol dioleate (Ester D) and pentaerythritol tetraoleate (Ester E).

TABLE 2

| Polymer Ex # | polymer solids, wt % | ASTM D97 Pour Point, °C. | | | | |
|---|---|---|---|---|---|---|
| | | Ester A | Ester B | Ester C | Ester D | Ester E |
| — | — | −51 | −30 | −42 | −30 | −27 |
| 1 | 0.06 | −51 | −24 | −45 | −45 | −24 |
| 2 | 0.06 | — | −30 | — | — | −24 |
| 6 | 0.06 | — | −24 | — | — | −24 |
| 9 | 0.06 | — | −24 | — | — | −27 |

Examples 1A–10A

Each of the lubricating oil compositions of Examples 1A–10A was made by adding a respective one of the polymer solutions of Examples 1–10 to canola oil (Calgene C-102), in an amount effective to provide 0.39 wt % polymer solids in the lubricating oil composition.

The low temperature stability of each of the lubricating oil compositions was evaluated by monitoring the appearance of two sets of samples of the respective compositions, each stored at −25° C. Canola oil alone was solid after one day at −25° C. The stability of a sample was defined as the number of days that the sample remained fluid under the test conditions. The results for both sets of samples of each of the compositions of Examples 1A–10A are set forth below in TABLE 3 as stability at −25° C., expressed in days.

TABLE 3

| Ex #, Lubricating Composition | Ex #, Polymer | Stability, −25° C. (days) |
|---|---|---|
| 1A | 1 | 8,7 |
| 2A | 2 | 1,1 |
| 3A | 3 | 8,4 |
| 4A | 4 | 8,— |
| 5A | 5 | 5,4 |
| 6A | 6 | 5,6 |
| 7A | 7 | 4,4 |
| 8A | 8 | —,4 |
| 9A | 9 | —,3 |
| 10A | 10 | —,1 |

Example 1B

The lubricating oil composition of Example 1B was made by adding the polymer solution of Example 1 to canola oil (Calgene C-102) in an amount effective to provide 0.79 wt % polymer solids in the lubricating oil composition.

The pour point of the each of the compositions of Examples 1A and 1B and of the canola oil alone were measured according to ASTM D97. The kinematic viscosity of each of the compositions of Examples 1A and 1B and of the canola oil alone were measured according to ASTM D445 at several different temperatures. The Brookfield viscosity of each of the compositions of Examples 1A and 1B and of the canola oil alone were measured according to ASTM D2983 at several different temperatures.

Results are set forth below in TABLE 4 as Pour Point, expressed in degrees centigrade (°C), Kinematic Viscosity, expressed in centiStokes (cSt) and Brookfield viscosity, expressed in centiPoise (cP) for each of the compositions of Examples 1A and 1B and the canola oil alone.

TABLE 4

| | Canola Oil | Example 1A | Example 1B |
|---|---|---|---|
| Pour Point (°C.) | −24 | −33 | −33 |
| Kinematic Viscosity | | | |
| (cSt), 40° C. | 35.95 | 37.38 | 38.76 |
| 0° C. | — | 231.2 | 243.6 |
| −10° C. | — | 446.2 | 469.8 |
| −20° C. | — | 1026 | 1067 |
| −30° C. | — | 4239 | 3938 |
| Brookfield Viscosity | | | |
| (cP), −10° C. | — | 550 | 600 |
| −20° C. | — | 1450 | 1500 |
| −26° C. | solid | 2400 | 3300 |
| −30° C. | solid | 3350 | 4350 |
| −40° C. | solid | solid | solid |

We claim:

1. A biodegradable lubricating oil composition, comprising:

from 0.01 weight per cent to 2 weight per cent of a polymer having a weight average molecular weight, determined by gel permeation chromatography, from 50,000 to 1,000,000, the polymer comprising from 90 weight percent to 99.5 weight percent first repeating units, each derived from a monomer selected from one or more of lauryl methacrylate and myristyl methacrylate; and from 0.5 weight percent to 10 weight percent second repeating units, each derived from a monomer selected from one or more of cetyl methacrylate, stearyl methacrylate and eicosyl methacrylate; and from 98 weight percent to 99.99 weight percent of a polyol ester, wherein the polyol ester is trimethylolpropane trioleate or neopentyl glycol dioleate.

2. An additive for a polyol ester-based lubricating oil composition, comprising:

from about 25 weight percent to 75 weight percent of a polymer having a weight average molecular weight, determined by gel permeation chromatography, from 50,000 to 1,000,000, the polymer comprising:

from 90 weight percent to 99.5 weight percent first repeating units, each derived from a monomer selected from one or more of lauryl methacrylate and myristyl methacrylate; and from 0.5 weight percent to 10 weight percent second repeating units, each derived from a monomer selected from one or more of cetyl methacrylate, stearyl methacrylate and eicosyl methacrylate; and from 25 weight percent to 75 weight percent of polyol ester; wherein the polyol ester is trimethylolpropane trioleate or neopentyl glycol dioleate.

3. A method for lowering the pour point of a polyol ester, comprising:

adding from 0.01 parts by weight to 2 parts by weight of a polymer having a weight average molecular weight, determined by gel permeation chromatography, from 50,000 to 1,000,000, the polymer comprising from 90 weight percent to 99.5 weight percent first repeating units, each derived from a monomer selected from one or more of lauryl methacrylate and myristyl methacrylate, and from 0.5 weight percent to 10 weight percent second repeating units, each derived from a monomer selected from one or more of cetyl methacrylate, stearyl methacrylate, and eicosyl methacrylate, to 98 parts by weight to 99.99 parts by weight of a polyol ester, wherein the polyol ester is trimethylolpropane trioleate or neopentyl glycol dioleate.

4. A biodegradable lubricating oil composition, consisting essentially of:

from 0.01 weight per cent to 2 weight per cent of a polymer having a weight average molecular weight, determined by gel permeation chromatography, from 50,000 to 1,000,000, the polymer comprising from 70 weight percent to 99.5 weight percent first repeating units, each derived from a monomer selected from one or more of lauryl methacrylate, myristyl methacrylate, tridecyl methacrylate and pentadecyl methacrylate; and from 0.5 weight percent to 30 weight percent second repeating units, each derived from a monomer selected from one or more of cetyl methacrylate, stearyl methacrylate and eicosyl methacrylate and; and from 98 weight per cent to 99.99 weight per cent of a vegetable oil selected from one or more of canola oil, sunflower oil and soy bean oil.

5. An additive for a vegetable oil-based lubricating oil composition, comprising:

from about 25 weight percent to 75 weight percent of a polymer having a weight average molecular weight, determined by gel permeation chromatography, from 50,000 to 1,000,000, the polymer comprising:

from 70 weight percent to 99.5 weight percent first repeating units, each derived from a monomer selected from one or more of lauryl methacrylate, myristyl methacrylate, tridecyl methacrylate and pentadecyl methacrylate; and from 0.5 weight percent to 30 weight percent second repeating units, each derived from a monomer selected from one or more of cetyl methacrylate, stearyl methacrylate and eicosyl methacrylate; and from 25 weight percent to 75 weight percent of a vegetable oil selected from one or more of canola oil, sunflower oil and soy bean oil.

6. The additive of claim 5, wherein the polymer comprises:

from 82 weight percent to 97.5 weight percent first repeating units and from 2.5 weight percent to 18 weight percent second repeating units.

7. A method for lowering the pour point of a vegetable oil, comprising:

adding from 0.01 parts by weight to 2 parts by weight of a polymer having a weight average molecular weight, determined by gel permeation chromatography, from 50,000 to 1,000,000, the polymer comprising from 70 weight percent to 99.5 weight percent first repeating units, each derived from a monomer selected from one or more of lauryl methacrylate, myristyl methacrylate, tridecyl methacrylate and pentadecyl methacrylate; and from 0.5 weight percent to 30 weight percent second repeating units, each derived from a monomer selected from one or more of cetyl methacrylate, stearyl methacrylate, eicosyl methacrylate and mixtures thereof, to 98 parts by weight to 99.99 parts by weight of a vegetable oil selected from one or more of canola oil, sunflower oil and soy bean oil.

8. A method for increasing the low temperature stability of a vegetable oil, comprising:

adding from 0.01 parts by weight to 2 parts by weight of a polymer having a weight average molecular weight, determined by gel permeation chromatography, from 50,000 to 1,000,000, the polymer comprising from 70 weight percent to 99.5 weight percent first repeating units, each derived from a monomer selected from one or more of lauryl methacrylate, myristyl methacrylate, tridecyl methacrylate and pentadecyl methacrylate; and from 0.5 weight percent to 30 weight percent second repeating units, each derived from a monomer selected from one or more of cetyl methacrylate, stearyl methacrylate and eicosyl methacrylate, to 98 parts by weight to 99.99 parts by weight of canola oil.

9. A method for increasing the low temperature stability of a vegetable oil, comprising:

adding from 0.01 parts by weight to 2 parts by weight of a polymer having a weight average molecular weight, determined by gel permeation chromatography, from 50,000 to 1,000,000, the polymer comprising from 70 weight percent to 75 weight percent first repeating units, each derived from a monomer selected from one or more of lauryl methacrylate, myristyl methacrylate, tridecyl methacrylate and pentadecyl methacrylate; and from 25 weight percent to 30 weight percent second repeating units, each derived from a monomer selected from one or more of cetyl methacrylate, stearyl methacrylate and eicosyl methacrylate; to 98 parts by weight to 99.99 parts by weight of sunflower oil.

10. A method for increasing the low temperature stability of a vegetable oil, comprising:

adding from 0.01 parts by weight to 2 parts by weight of a polymer having a weight average molecular weight, determined by gel permeation chromatography, from 50,000 to 1,000,000, the polymer comprising from 94 weight percent to 100 weight percent first repeating units, each derived from a monomer selected from one or more of lauryl methacrylate, myristyl methacrylate, tridecyl methacrylate and pentadecyl methacrylate; and from zero weight percent to 6 weight percent second repeating units, each derived from a monomer selected from one or more of cetyl methacrylate and stearyl methacrylate; to 98 parts by weight to 99.99 parts by weight of soy bean oil.

* * * * *